(12) United States Patent
Goyal et al.

(10) Patent No.: US 12,587,531 B2
(45) Date of Patent: Mar. 24, 2026

(54) BROWSER PROFILE SEPARATION FOR A MANAGED USER ACCOUNT

(71) Applicant: GOOGLE LLC, Mountain View, CA (US)

(72) Inventors: Anuj Goyal, Mountain View, CA (US); Yulian Pastarmov, Aargau (CH); Yann Dago, Laval (CA); Zhechen Min, Montreal (CA)

(73) Assignee: GOOGLE LLC, Mountain View, CA (US)

( * ) Notice: Subject to any disclaimer, the term of this patent is extended or adjusted under 35 U.S.C. 154(b) by 133 days.

(21) Appl. No.: 18/056,557

(22) Filed: Nov. 17, 2022

(65) Prior Publication Data

US 2024/0171581 A1 May 23, 2024

(51) Int. Cl.
*H04L 9/40* (2022.01)
*G06F 9/451* (2018.01)

(52) U.S. Cl.
CPC ............ *H04L 63/102* (2013.01); *G06F 9/451* (2018.02); *H04L 63/08* (2013.01)

(58) Field of Classification Search
CPC ........ H04L 63/102; H04L 63/08; G06F 9/451
USPC .......................................................... 726/6
See application file for complete search history.

(56) References Cited

U.S. PATENT DOCUMENTS

| | | | |
|---|---|---|---|
| 2007/0214272 A1* | 9/2007 | Isaacson ................. | G06F 21/31 |
| | | | 709/229 |
| 2012/0131683 A1* | 5/2012 | Nassar ................... | G06F 21/604 |
| | | | 726/28 |
| 2014/0196129 A1* | 7/2014 | Amin ...................... | H04L 63/08 |
| | | | 726/6 |
| 2015/0019985 A1* | 1/2015 | Murphy ................ | G06F 16/957 |
| | | | 715/744 |
| 2021/0144229 A1* | 5/2021 | Mall ................... | H04L 61/4511 |

* cited by examiner

*Primary Examiner* — Moeen Khan
(74) *Attorney, Agent, or Firm* — Brake Hughes Bellermann LLP

(57) ABSTRACT

According to an aspect, a method includes rendering a first window of a browser application on a computing device, where the first window has a first browser profile associated with a non-managed user account, and the first window displays a tab requesting an authentication credential to access a resource of the browser application. The method includes receiving, via the tab, an authentication credential of a managed user account to access the resource of the browser application, in response to the authentication credential being authenticated, determining whether the managed user account is associated with a second browser profile, and, in response to determining that the managed user account is not associated with the second browser profile, rendering a user interface (UI) object that prompts a user to create the second browser profile for the managed user account.

14 Claims, 11 Drawing Sheets

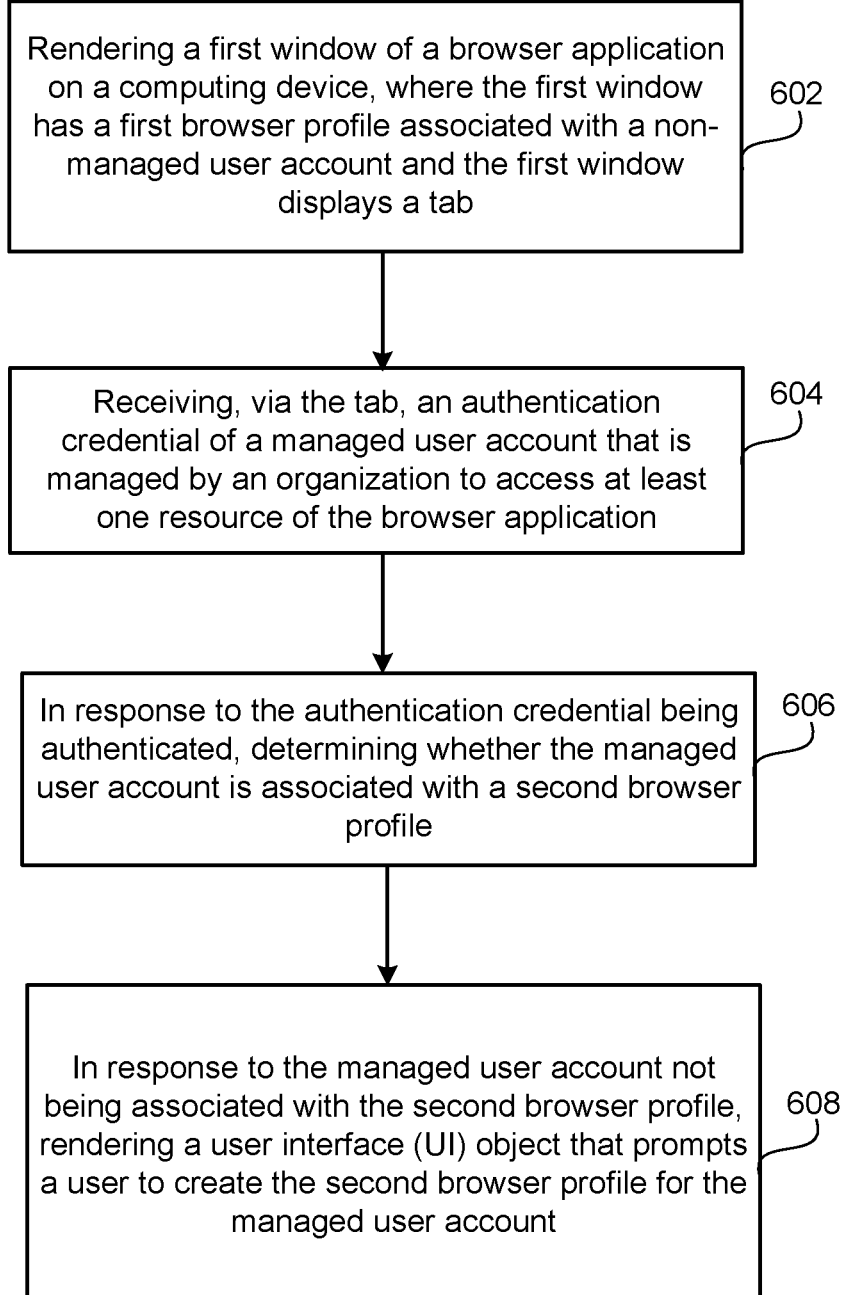

600

Rendering a first window of a browser application on a computing device, where the first window has a first browser profile associated with a non-managed user account and the first window displays a tab                    602

Receiving, via the tab, an authentication credential of a managed user account that is managed by an organization to access at least one resource of the browser application                    604

In response to the authentication credential being authenticated, determining whether the managed user account is associated with a second browser profile                    606

In response to the managed user account not being associated with the second browser profile, rendering a user interface (UI) object that prompts a user to create the second browser profile for the managed user account                    608

FIG. 6

BROWSER PROFILE SEPARATION FOR A MANAGED USER ACCOUNT

BACKGROUND

An administrator of an organization may create policies and define browser settings, which are enforced on a browser application when a user signs into the browser application using a managed user account on a computing device (e.g., an unmanaged device). Also, the user may have a personal account that can be used to sign into a browser profile, and the user's personal browser settings are applied during the browsing session. In some examples, the user may sign into the browser profile using their personal account on the unmanaged device but use their work account to access one of more resources of the browser application (e.g., email, file storage, etc.) while under their personal browser profile, which enables the user to access organization data without the organization's browser policies and settings being applied during the browsing session.

SUMMARY

This disclosure relates to a management system that enables an administrator to require a user to set up a separate browser profile when the user signs into a browser application using their managed user account on an unmanaged device. If a browser profile already exists for the managed user account, the browser application renders a new browsing instance (e.g., a new window) with the browser profile of the managed user account. Because users are forced to set up a separate browser profile, a user signed-in with a non-managed account is not able to access organizational data, thereby enabling an administrator to ensure policies applicable to applications accessible via the managed user account are consistently applied.

According to an aspect, a method includes rendering a first window of a browser application on a computing device, where the first window has a first browser profile associated with a non-managed user account (e.g., a first user account), and the first window displays a tab requesting an authentication credential to access a resource of the browser application. The method includes receiving, via the tab, an authentication credential of a managed user account (e.g., a second user account) to access the resource of the browser application, in response to the authentication credential being authenticated, determining whether the managed user account is associated with a second browser profile, and, in response to determining that the managed user account is not associated with the second browser profile, rendering a user interface (UI) object that prompts a user to create the second browser profile for the managed user account.

According to an aspect, a non-transitory computer-readable medium storing executable instructions that when executed by at least one processor causes the at least one processor to execute operations. The operations include rendering a first window of a browser application on a computing device, the first window having a first browser profile associated with a non-managed user account, the first window displaying a tab, receiving, via the tab, an authentication credential of a managed user account that is managed by an organization to access a resource of the browser application, in response to the authentication credential being authenticated, determining whether the managed user account is associated with a second browser profile, and in response to determining that the managed user account is associated with the second browser profile, rendering a second window under the second browser profile, the second window including a new tab to access the resource.

An apparatus includes at least one processor, and a non-transitory computer-readable medium storing executable instructions that cause the at least one processor to render a first window of a browser application on a computing device, the first window having a first browser profile associated with a non-managed user account, the first window displaying a tab, receive, via the tab, an authentication credential of a managed user account that is managed by an organization to access a resource of the browser application, in response to the authentication credential being authenticated, determine whether the managed user account is associated with a second browser profile, and, in response to the managed user account not being determined as associated with the second browser profile, render a user interface (UI) object that prompts a user to create the second browser profile for the managed user account.

The details of one or more implementations are set forth in the accompanying drawings and the description below. Other features will be apparent from the description and drawings, and from the claims.

BRIEF DESCRIPTION OF THE DRAWINGS

FIG. 6 illustrates a flowchart depicting example operations of a browser application according to an aspect.

DETAILED DESCRIPTION

This disclosure relates to a management system that enables an administrator to require a user to establish a separate browser profile when the user signs into a managed resource of a browser application using their managed user account on an unmanaged device. If a browser profile (e.g., a managed browser profile) already exists for the managed user account, the browser application may initiate (e.g., open, render) a new browsing instance (e.g., a new window) with the browser profile of the managed user account. The browser application may enable a user to create different browser profiles and permit the user to switch between their managed user account and other accounts (e.g., personal accounts), without signing out each time. In some examples, no data or content is shared between the browser profiles, and the browser policies and settings, defined by an administrator, for managed user accounts are applied only to managed browser profiles. As a result, because users are forced to set up a separate browser profile to access a managed resource (e.g., email, file storage, website, etc.), a user signed-in to a browser application with a non-managed account is not able to access organizational data, thereby ensuring managed resources are accessed under the policies and settings selected by the administrator.

Figure 1A:
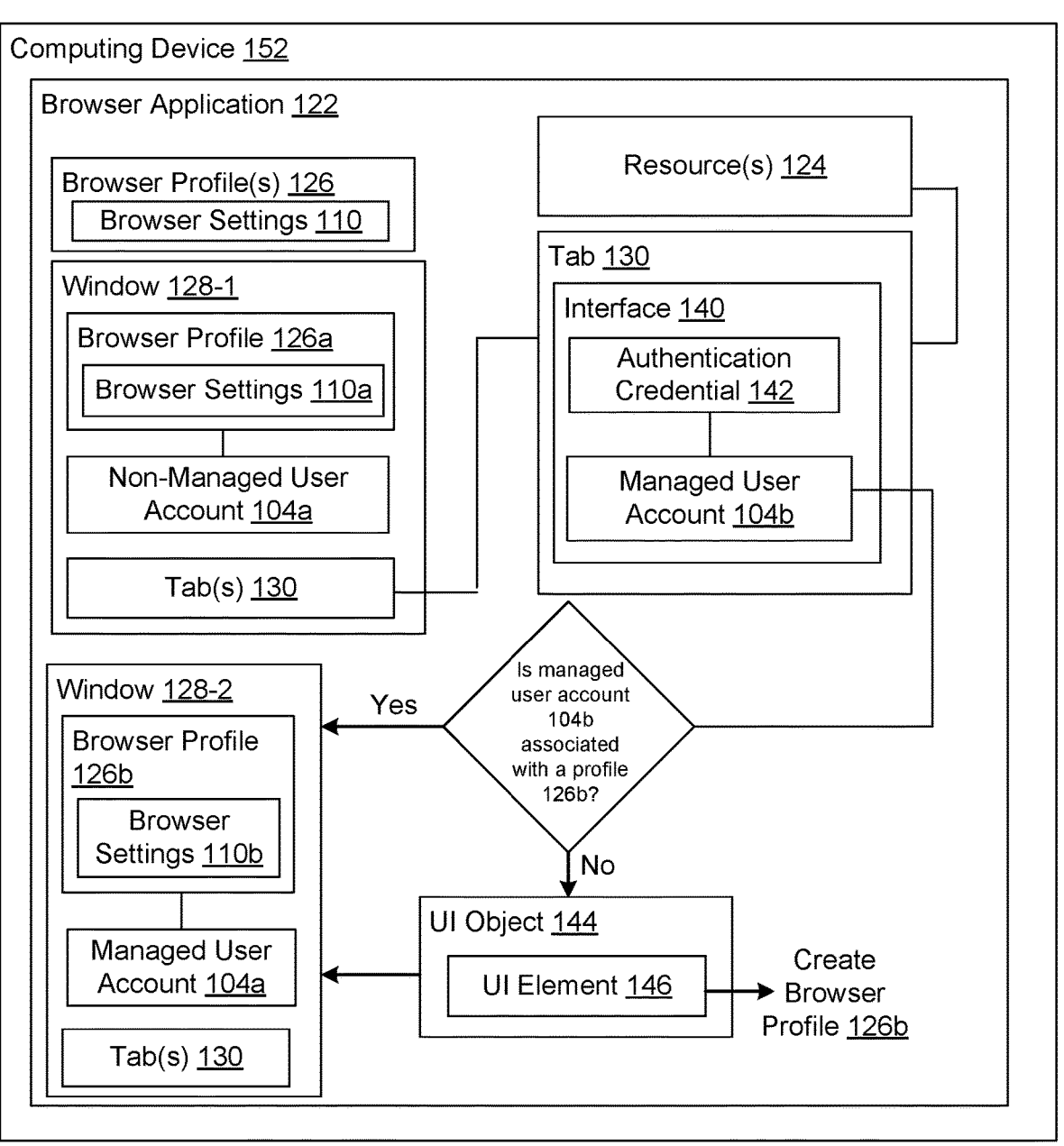
FIG. 1A illustrates a browser application for enabling browser profile separation according to an aspect.
Figure 1B:
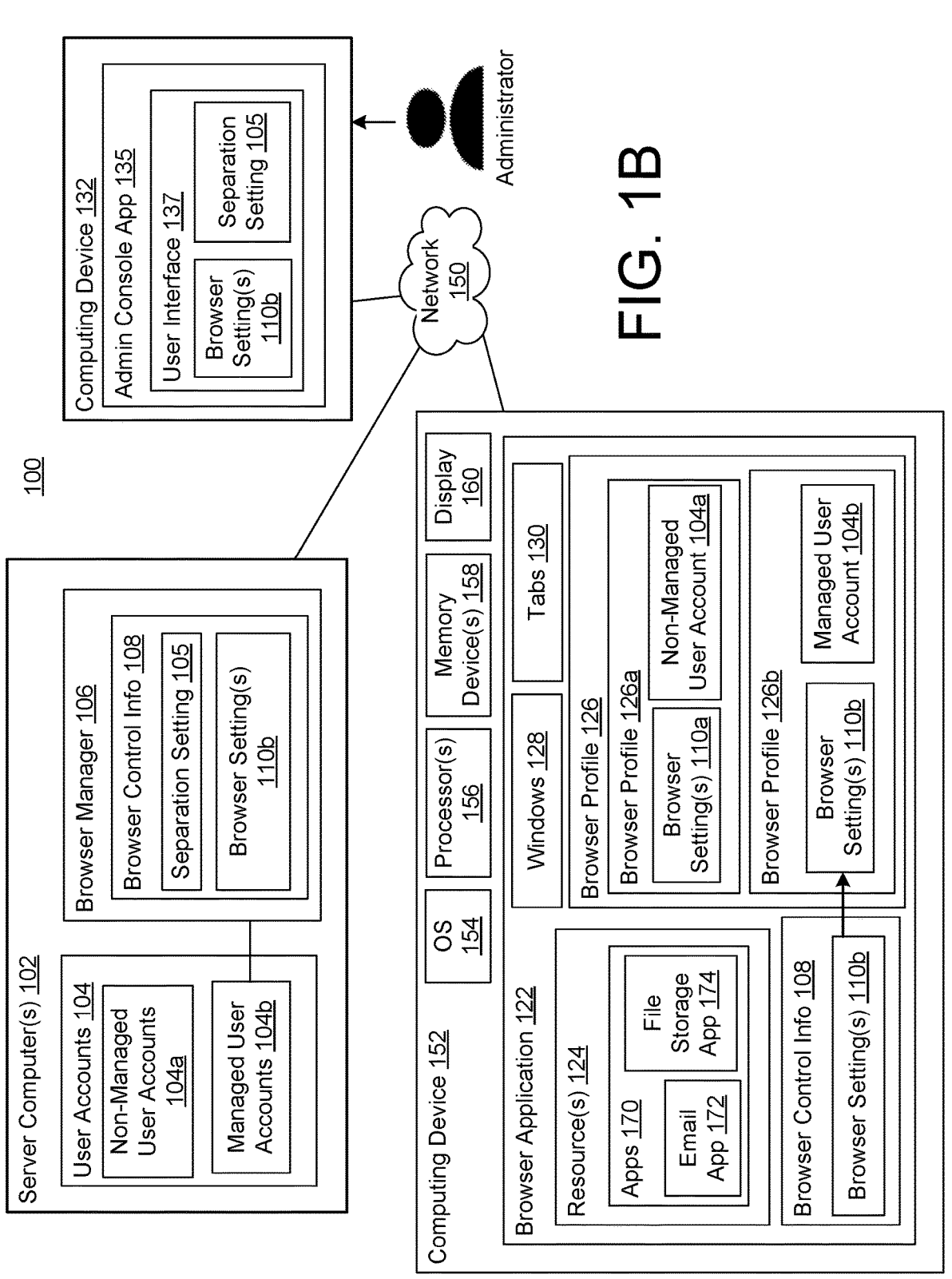
FIG. 1B illustrates a management system for enabling browser profile separation according to an aspect.

FIGS. 1A and 1B illustrate a management system 100 according to an aspect. The management system 100 includes an administrator's computing device 132, a browser manager 106 executable by one or more server computers 102, and a user's computing device 152.

The management system 100 enables an administrator of an organization to require a user to establish a browser profile 126b (e.g., a managed browser profile) when the user signs into a resource 124 (e.g., a managed resource) of a browser application 122 using their managed user account 104b, where the resource 124 is provided in a window 128-1 associated with a non-managed browser profile (e.g., browser profile 126a). If a browser profile 126b already exists for the managed user account 104b when the user signs into the managed resource in a window 128-1 associated with the non-managed profile (e.g., browser profile 126a), the browser application 122 may render a new browser instance (e.g., a new window 128-2) with the browser profile 126b of the managed user account 104b.

In this manner, the browser application 122 can apply an organization's browser settings 110b (defined by an administrator) to resources 124 accessible via the window 128-2 and any tabs 130 associated with the window 128-2 so that organization data can be protected. For example, the organization's browser settings 110b may define data loss prevention (DLP) controls(s) that restrict the display and/or transfer of information, and these DLP control(s) can be applied to browser activity under the browser profile 126b. By ensuring that the managed user account 104b has a separate profile, the browser application 122 may enforce the DLP control(s) to the organization's resources 124, which are accessible via the browser application 122.

A browser instance (e.g., a window 128) is associated with a browser profile 126, and, in some examples, each browser instance can only have one browser profile 126. In some examples, a user can sign-in with multiple user accounts 104 on the same browser instance. By forcing separation of browser application instances with different browser profiles, browser settings 110b defined by an organization are applied only to the managed profile (e.g., the browser profile 126b), but not to non-managed profiles (e.g., browser profile 126a). For example, when the user signs into a resource 124 with a managed user account 104a in a window 128-1 with a non-managed profile (e.g., the browser profile 126a), rather than allowing the user to open the resource 124 in the window 128-1 under the browser profile 126a (which would not apply the organization's browser settings), the browser application 122 renders a new browser instance (e.g., window 128-2) associated with the browser profile 126b. Because the browser profile 126b is a managed profile, the browser application 122 can apply the organization's browser settings 110b to the window 128-2 (associated with browser profile 126b).

The browser application 122 may be a web browser configured to access information on the Internet. In some examples, the browser application 122 is a separate application from an operating system 154 of the computing device 152. The browser application 122 may be installable on (and executable by) the operating system 154. In some examples, the browser application 122 is the device's operating system 154 (or included as part of the device's operating system 154). The browser application 122 may launch one or more tabs 130 (e.g., browser tabs) in the context of one or more windows 128 (e.g., browser windows) on a display 160 of the computing device 152.

The browser application 122 may include or be associated with one or more resource(s) 124. The resources 124 may include program(s)/web application(s) and/or file storage(s), executable by the browser application 122, and can be managed by an organization that manages a managed user account 104b. When a user signs into a resource 124 using their managed user account 104b, the resource 124 is a managed resource and may include settings, controls, and/or policies (e.g., browser settings 110b) determined by the administrator. The resource(s) 124 may include applications 170. In some examples, the applications 170 include an email application 172. In some examples, the applications 170 includes a file storage application 174 (e.g., a web or cloud storage application). The applications 170 may include extensions to the browser application 122. An extension (if enabled) adds a feature or function to the browser application 122. In some examples, an extension may be HTML, CSS, and/or JavaScript based extension. The applications 170 may include web applications. A web application may be an application program that is stored on a remote server (e.g., a web server) and delivered over a network through the browser application 122. In some examples, the resources 124 include a website rendered by the browser application 122. For example, the website may include an interface that allows the user to sign in with a managed user account 104b.

The browser application 122 may be associated with one or more browser profiles 126. A browser profile 126 is associated with a user account 104. A browser profile 126 may define browser settings 110 for a person associated with the user account 104. The browser settings 110 may include a wide variety of settings such as privacy options, security settings, search engine preferences, and/or autofill and auto-complete behavior. Also, the browser settings 110 may include information such as the user's bookmarks, passwords, search history, favorites, and/or which applications 170 (e.g., extensions, web applications, etc.) are enabled or installed. In some examples, multiple browser profiles 126 can exist for a single user account 104, where each user can create a new browser profile 126 that stores the user's preferences and settings and may store information about the user's use of the browser application 122.

A browser profile 126a may be considered a user profile for a non-managed user account 104a (e.g., a first user account). The browser profile 126a includes browser settings 110a. When the user is signed into the browser application 122 using their non-managed user account 104a, a user can select bookmarks, save passwords, install one or more applications 170, check their email application 172 associated with the non-managed user account 104a, and/or access information and files on a file storage application 174. This information may be stored in the browser profile 126a as browser settings 110a.

A browser profile 126b may be considered a user profile for a managed user account 104b (e.g., a second user account). The browser profile 126b includes browser settings 110b. The browser settings 110b may include one or more settings that are different from the browser settings 110a. When the browser application 122 is operating under the browser profile 126b (e.g., the user signs into the browser application 122 using the managed user account 104b), the browser application 122 is managed by browser control information 108, which is defined by an administrator of an organization. The browser control information 108 may include information that defines one or more of the browser settings 110b (e.g., set by the administrator of the organization). The browser control information 108 may be defined by the administrator using their computing device 132, and the browser control information 108 may be transmitted to the browser manager 106 via a network 150. The browser manager 106 may transmit to computing devices having managed browser profiles (one of which is illustrated as computing device 152) when users sign into their managed browser profiles.

A non-managed user account 104a is a user account 104 (e.g., userA@browser.com) for the browser application 122 and/or resource(s) 124 associated with the browser application 122 (e.g., an email, file storage, extensions, etc.). In some examples, the non-managed user account 104a is a user account that is not controlled and/or managed by an entity (e.g., business, school, etc.) other than the user. In some examples, the non-managed user account 104a is a personal account of the user. In some examples, the non-managed user account 104a is referred to as a first user account. The non-managed user account 104a may be associated with an authentication credential (e.g., username, password, etc.), which the user uses to sign into the browser application 122 (and/or a resource 124 of the browser application 122) with their non-managed user account 104a. For example, the user can sign into an email application, provided by the browser application 122, using their non-managed user account's authentication credential, to check their personal emails.

A managed user account 104b is another user account 104 (e.g., userA@work.com) for the browser application 122 and/or resource(s) 124 associated with the browser application 122. In some examples, the managed user account 104b is a user account that is controlled and/or managed by an entity other than the user. In some examples, the managed user account 104b is an account created by an organization. In some examples, the managed user account 104b is a work account for the user. In some examples, the managed user account 104b is a student account for the user. In some examples, the managed user account 104b is referred to as a second user account. The managed user account 104b may be associated with an authentication credential (e.g., username, password, etc.), which the user uses to sign into the browser application 122 (and/or a resource 124 of the browser application 122) with their managed user account 104b. For example, the user can sign into an email application, provided by the browser application 122, using their managed user account's authentication credential, to check their work emails.

In some examples, the non-managed user account 104a and the managed user account 104b are two different user accounts for the same user. In some examples, the two user accounts (e.g., 104a, 104b) are not managed and non-managed user accounts, but rather two separate accounts for the same user (e.g., two different work accounts, two different personal accounts, etc.). In some examples, the two user accounts (e.g., 104a, 104b) include separate email addresses (each having a password) that are used to log into a resource 124 of the browser application 122. The terms first user account and second user account may be used interchangeably with non-managed user account 104a and managed user account 104b, respectively.

When the user is signed into the browser application 122 using their managed user account 104b, some browser settings 110b may be determined by the administrator such as which applications 170 are available to be installed, which applications 170 are forceable installed (e.g., installed without user interaction), which application 170 are blocked from being installed and/or which websites are blocked or allowed. The browser settings 110b may include settings or controls for one or more of the resources 124. The browser settings 110b may include DLP control settings that define restrictions to computer functions (e.g., disable printing, screenshots, screencast, file transfer, etc.). Also, the user can select bookmarks, save passwords, check their email application 172 associated with the managed user account 104b, and/or access information and files on a file storage application 174, which may include organization data associated with the organization. In some examples, information is not shared across the browser profile 126a and the browser profile 126b.

In some examples, the browser application 122 may include a UI element or control that enables the user to select a particular browser profile 126. In response to the selection of the browser profile 126a, the browser application 122 renders a new window 128 with the browser settings 110a of the browser profile 126a. In response to the selection of the browser profile 126b, the browser application 122 renders a new window 128 with the browser settings 110b of the browser profile 126b.

When the browser application 122 is operating under the browser profile 126a (e.g., the user signs into the browser application 122 using the non-managed user account 104a), the browser application 122 is not managed by the organization. In some examples, the user may sign into the browser application 122 using their non-managed user account 104a but can use their managed user account 104b to access one of more resources 124 of the browser application 122 (e.g., email application 172, file storage application 174, etc.) while under the browser profile 126a, which can cause the user to access organization data without browser policies (e.g., browser control information 108) from being applied during the browsing instance. For example, when the browser application 122 is operating under the browser profile 126a, the browser settings 110a are applied to the browser application 122. In some examples, while under the browser profile 126a, the user may sign into a particular application 170 of the browser application 122 using their managed user account 104b, which can cause the user to access information and/or programs associated with the organization without the browser settings 110b being applied.

However, the browser application 122, as further discussed below, is configured to force the user to set up a separate browser profile 126b when the user signs into the browser application 122 using their managed user account 104b. If a browser profile 126b already exists for the managed user account 104b, the browser application 122 may render a new browser instance (e.g., a new window 128-2) with the browser profile 126b of the managed user account 104b.

As shown in FIG. 1A, the browser application 122 may render a window 128-1 on a display 160 of the computing device 152, where the window 128-1 has a browser profile 126a associated with the non-managed user account 104a. In some examples, after the computing device 152 is activated or the browser application 122 is launched, the user may select the browser profile 126a or the window 128-1 may be rendered with the browser profile 126a (without user selection). The window 128-1 may be referred to as a browser window or a browser instance.

The window 128-1 includes a tab 130. The tab 130 may include UI elements, menus, and/or controls that can identify applications 170 (e.g., extensions, web applications, etc.), bookmarks, passwords, search history, favorites, and/or other browser settings 110a associated with the browser profile 126a. The user may use the browser application 122 to launch additional tabs 130 and/or additional browser instances (e.g., windows 128-1) under the browser profile 126a. The user may use the browser application 122 to view their email application 172 associated with the non-managed user account 104a and/or access data in a file storage application 174 associated with the non-managed user account 104a.

Referring to FIG. 1A, the browser application 122 may receive, via a tab 130, an authentication credential 142 of a managed user account 104b to access a resource 124 of the browser application 122. In some examples, the authentication credential 142 includes the username and password for the managed user account 104b. With the window 128-1 under the browser profile 126a, the user may decide to check their email associated with their managed user account 104b or access organization data on a file storage application 174 associated with their managed user account 104b. The tab 130 may include a section that allows the user to add a user account 104 to the browser profile 126a, and, in response to a selection to add a user account 104, the tab 130 may display an interface 140 that allows the user to enter their authentication credential (e.g., username, password, etc.) associated with their managed user account 104b.

In response to the authentication credential 142 being authenticated (and before a tab 130 is rendered that includes the email application 172 of the managed user account 104b), the browser application 122 determines whether the managed user account 104b is associated with a managed profile (e.g., browser profile 126b). In other words, the browser application 122 may determine whether the managed user account 104b is already associated with an existing browser profile 126b.

In response to the managed user account 104b being determined as not associated with a browser profile 126b, the browser application 122 may render a user interface (UI) object 144 that prompts the user to create a browser profile 126b. For example, before the user is granted access to any of the resources 124 associated with the managed user account 104b, the user is required to have a browser profile 126b that is associated with the managed user account 104b. When the browser profile 126b is created, the browser settings 110b can be applied to the browser application 122.

The UI object 144 may display information that indicates that an organization requires a browser profile 126b to be associated with the managed user account 104b. The UI object 144 may include a UI element 146, which, when selected, causes the browser application 122 to create the browser profile 126b. In some examples, the browser application 122 may display one or more UI elements or interfaces to customize the browser profile 126b such as selecting a profile image, color, and/or theme of the windows 128 or tabs 130.

After the browser profile 126b is created, the browser application 122 may generate a separate window 128-2 (or another browsing instance) with the browser profile 126b. As indicated above, the browser profile 126b of the managed user account 104b stores the bookmarks, passwords, search history, favorites, extensions, and/or other browser settings 110b while the user is using the browser application 122 under the browser profile 126b. In response to the managed user account 104b being determined as associated with the browser profile 126b, the browser application 122 may render a separate window 128-2 with one or more tabs 130 associated with the browser profile 126b.

Referring to FIG. 1B, an administrator may use their computing device 152 to set browser settings 110b for managed browser profiles (e.g., browser profile 126b) that are applied by the browser application 122 when users sign into the browser application 122 using their managed user accounts 104b. The computing device 132 includes an administrative console application 135 configured to manage browser profiles 126b of a browser application 122. In some examples, the administrative console application 135 is a web application executable (at least in part) by the browser application 122. In some examples, the administrative console application 135 is a native application installed and executed by an operating system 154 of the computing device 132.

The browser settings 110b may encompass a wide variety of settings such as browser history settings (e.g., controls whether the browser application 122 saves a user's browsing history and if they can clear browser data, including their viewing and download history), safe browsing settings (e.g., controls if safe browsing is activated), URL blocking setting (e.g., controls whether certain URLs are blocked), external storage devices (e.g., controls whether employees can use their devices to transfer data to external drives), application and extension settings such as allow, deny, and/or force-install lists that control which applications 170 are allowed, denied, and/or force-installed on their browser application 122 and/or computing device 152.

In some examples, profile separation is a setting selectable by the administrator. For example, a user interface 137 of the administrative console application 135 may display one or more user interface (UI) elements that allow the administrator to enable a separation setting 105 for managed browser profiles. Enablement of the separation setting 105 requires a user to set up a separate browser profile 126b when the user signs into the browser application 122 using their managed user account 104b, and if a browser profile 126b already exists for the managed user account 104b, enablement of the separation setting 105 causes the browser application 122 to render a new browser instance (e.g., a new window 128-2) with the browser profile 126b of the managed user account 104b.

The browser manager 106 may receive, over the network 150, information about the browser settings 110b and whether the separation setting 105 is enabled. The browser manager 106 may store the separation setting 105 and the browser settings 110b as browser control information 108 associated with an organization. In some examples, the browser manager 106 may transmit the browser control information 108 to computing devices (e.g., computing device 152) having managed browser profiles associated with the organization. The browser control information 108 may be part of a larger set of information that defines one or more policies (e.g., data loss prevention (DLP) controls, restricted or allowed applications or websites, forced installation policies, etc.) that are transmitted to and implemented by the browser application 122 on a computing device 152.

The browser manager 106 may store the browser control information 108 on one or more memory devices associated with the server computer(s) 102. In some examples, the browser manager 106 may identify the device identifiers, browser identifiers, and/or operating system identifiers for users having a browser profile 126b associated with the organization and send the browser control information 108 to the appropriate browser application 122. The browser application 122 may store the browser control information 108 (including the browser settings 110*b*) with respect to the browser profile 126*b* in a memory device 158 associated with the computing device 152 and/or the browser application 122.

In some examples, the browser manager 106 is used to synchronize browser data across multiple installations of a browser application 122 on separate devices. Browser synchronization (e.g., sync or browser sync) is a service provided by the browser application 122 for sharing settings and data across multiple installations of the browser application 122 (e.g., across multiple devices). For example, the browser manager 106 may be configured to synchronize user actions, browser history, and browser configurations across computing devices (including the computing device 152) associated with a user account (e.g., non-managed user account 104*a* or managed user account 104*b*). In some examples, browsing data may be synced across a particular browser profile 126. For example, a user may bookmark a particular web page using the browser application 122 under the browser profile 126*b*. If the user has signed into the browser application using the managed user account 104*b* with another device, browser data may be transmitted from the computing device 152 to the browser manager 106 and on to another computing device such that the bookmark also appears in the browser application 122 running on the other computing device.

The computing device 152 may be any type of computing device that includes one or more processors 156, one or more memory devices 158, a display 160, and an operating system 154 configured to execute (or assist with executing) one or more applications (including the browser application 122). In some examples, the computing device 152 is a laptop or desktop computer. In some examples, the computing device 152 is a tablet computer. In some examples, the computing device 152 is a smartphone. In some examples, the computing device 152 is a wearable device. In some examples, the display 160 is the display of the computing device 152. In some examples, the display 160 may also include one or more external monitors that are connected to the computing device 152. The operating system 154 is a system software that manages computer hardware, software resources, and provides common services for computing programs. In some examples, the operating system 154 is an operating system designed for a larger display 160 such as a laptop or desktop (e.g., sometimes referred to as a desktop operating system). In some examples, the operating system 154 is an operating system for a smaller display 160 such as a tablet or a smartphone (e.g., sometimes referred to as a mobile operating system).

The processor(s) 156 may be formed in a substrate configured to execute one or more machine executable instructions or pieces of software, firmware, or a combination thereof. The processor(s) 156 can be semiconductor-based—that is, the processors can include semiconductor material that can perform digital logic. The memory device(s) 158 may include a main memory that stores information in a format that can be read and/or executed by the processor(s) 156. The memory device(s) 158 may store the browser control information 108 and applications (e.g., the operating system 154, browser application 122, etc.) that, when executed by the processors 156, perform certain operations.

The computing device 132 may be an example of the computing device 152 and may include any of the features discussed with reference to the computing device 152. For example, the computing device 132 may be a laptop or a desktop computer. In some examples, the computing device 132 may be a tablet or a smartphone. The computing device 132 may include one or more processors and one or more memory devices. In some examples, the computing device 132 is associated with an administrator of an organization. For example, the administrator may be associated with an organization that manages the browser profile 126*b*.

The computing device 152 (and the computing device 132) may communicate with the server computer(s) 102 over the network 150. The server computer 102 may be computing devices that take the form of a number of different devices, for example a standard server, a group of such servers, or a rack server system. In some examples, the server computer(s) 102 may be a single system sharing components such as processors and memories. In some examples, the server computer(s) 102 may be multiple systems that do not share processors and memories. The network 150 may include the Internet and/or other types of data networks, such as a local area network (LAN), a wide area network (WAN), a cellular network, satellite network, or other types of data networks. The network 150 may also include any number of computing devices (e.g., computer, servers, routers, network switches, etc.) that are configured to receive and/or transmit data within network 150. Network 150 may further include any number of hardwired and/or wireless connections.

The server computer(s) 102 may include one or more processors formed in a substrate, an operating system (not shown) and one or more memory devices. The memory devices may represent any kind of (or multiple kinds of) memory (e.g., RAM, flash, cache, disk, tape, etc.). In some examples (not shown), the memory devices may include external storage, e.g., memory physically remote from but accessible by the server computer(s) 102. The server computer(s) 102 may include one or more modules or engines representing specially programmed software.

FIGS. 2A through 2F illustrate a user interface of a browser application according to an aspect. The browser application may be an example of the browser application 122 of FIGS. 1A and 1B and may include any of the details discussed with reference to those figures.

Figure 2A:
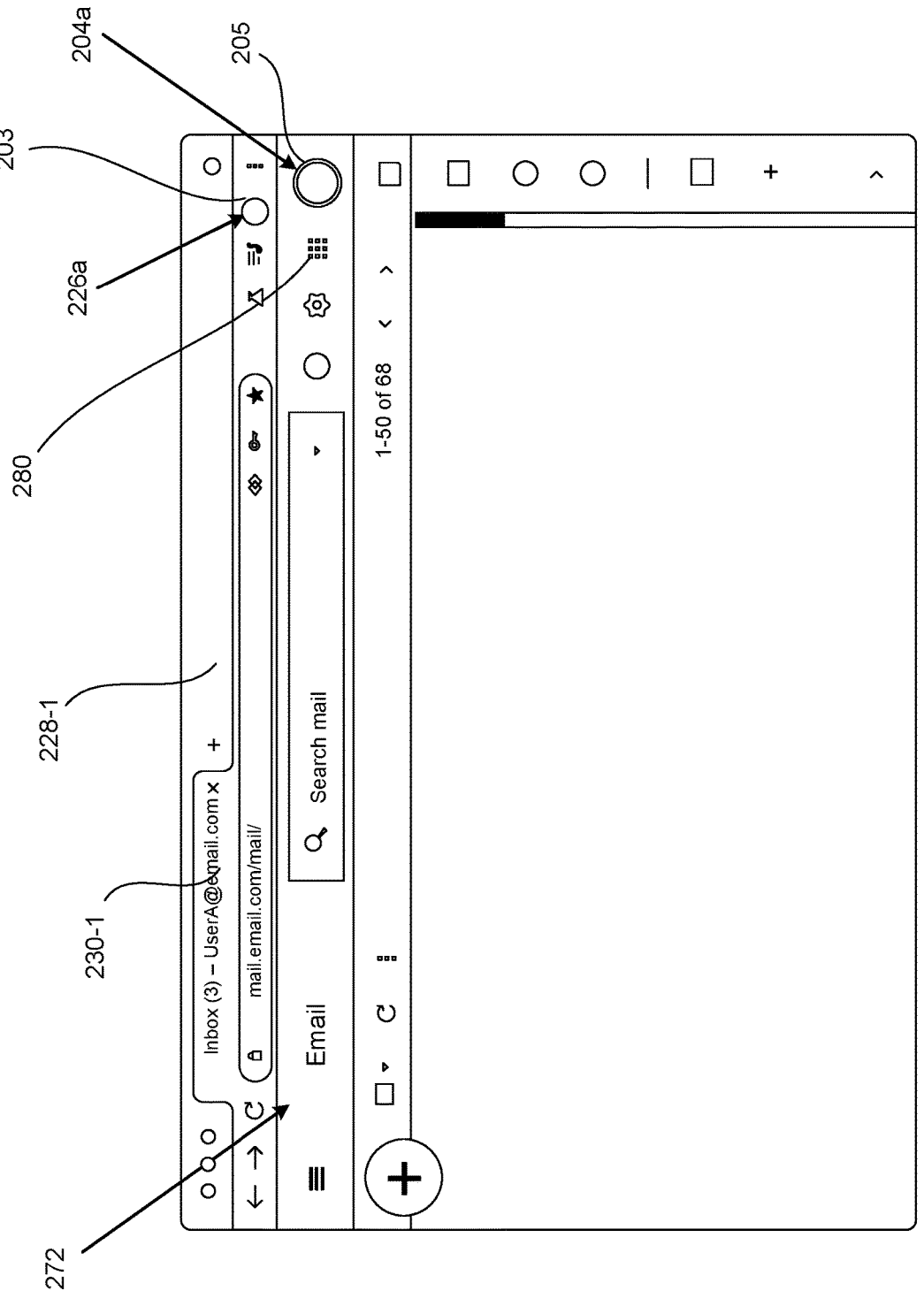
FIGS. 2A through 2F illustrate example user interfaces of the browser application for creating a browser profile for a managed user account when the browser application is signed-in with a non-managed user account according to various aspects.

In the example interface of FIG. 2A, a browser profile 226*a* of the browser application has been signed in with a non-managed user account 204*a*. The browser profile 226*a* may be considered a non-managed browser profile. The user interface displays a window 228-1 with a tab 230-1. The window 228-1 is associated with the browser profile 226*a*, and, therefore, the browser settings associated with the browser profile 226*a* are applied to the browser application. The tab 230-1 includes an email 272 of a non-managed user account 204*a*. The tab 230-1 includes a profile icon 203 representing the browser profile 226*a* of the non-managed user account 204*a*. The tab 230-1 includes a UI element 205 that represents the non-managed user account 204*a*. Also, the user interface includes a selectable icon 280, which, when selected, may identify which resources (e.g., resources 124 of FIGS. 1A and 1B) are associated with the browser profile 226*a*.

Figure 2B:
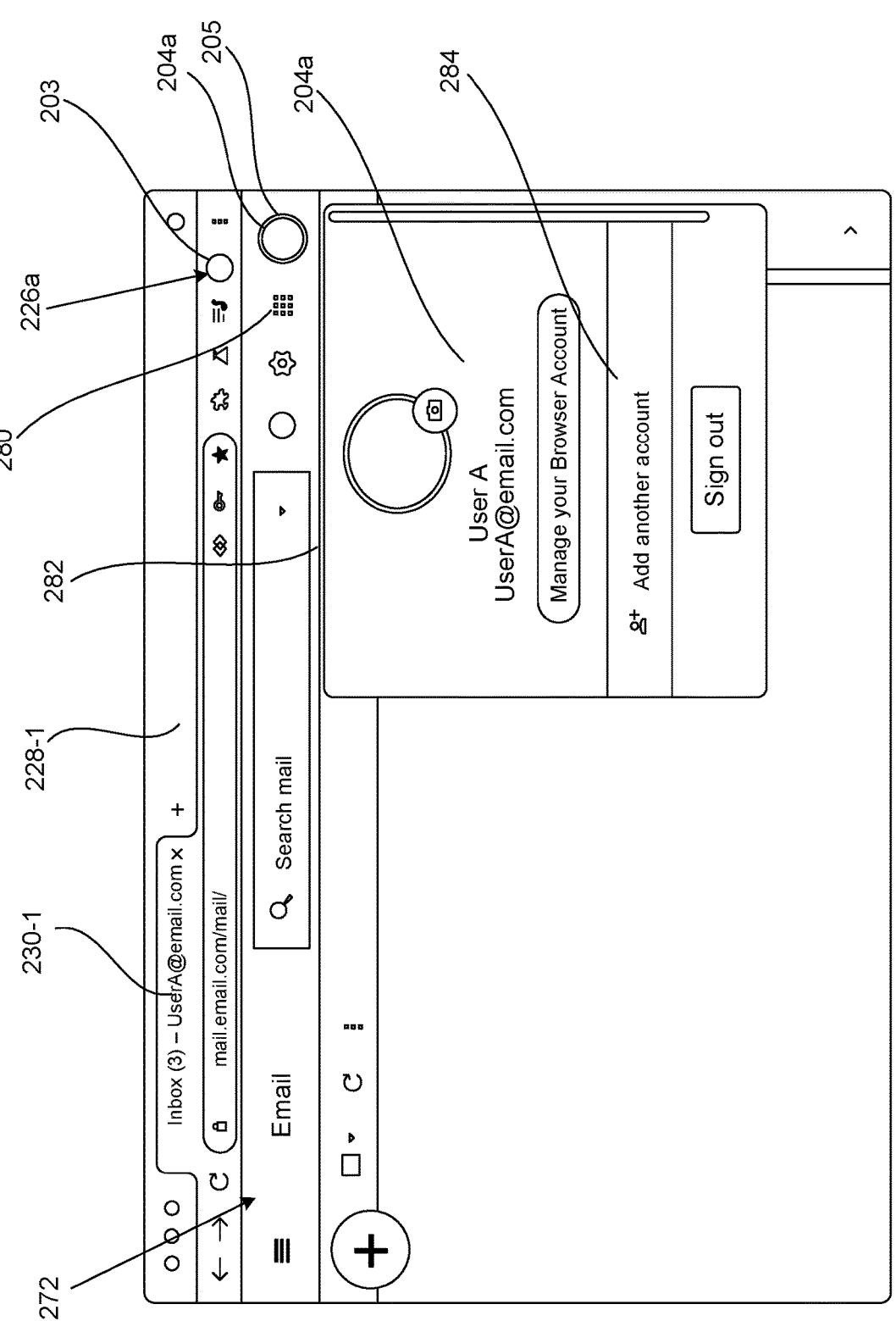

Referring to FIG. 2B, a user may select a UI element 205 (e.g., profile image) associated with the non-managed user account 204*a*, which causes the browser application to generate and render a UI object 282 that provides information about the non-managed user account 204*a*. The UI object 282 may include a UI element 284, which, when selected, causes the browser application to add a user account to the browser application.

Figures 2C, 2D, 2E, 2F:
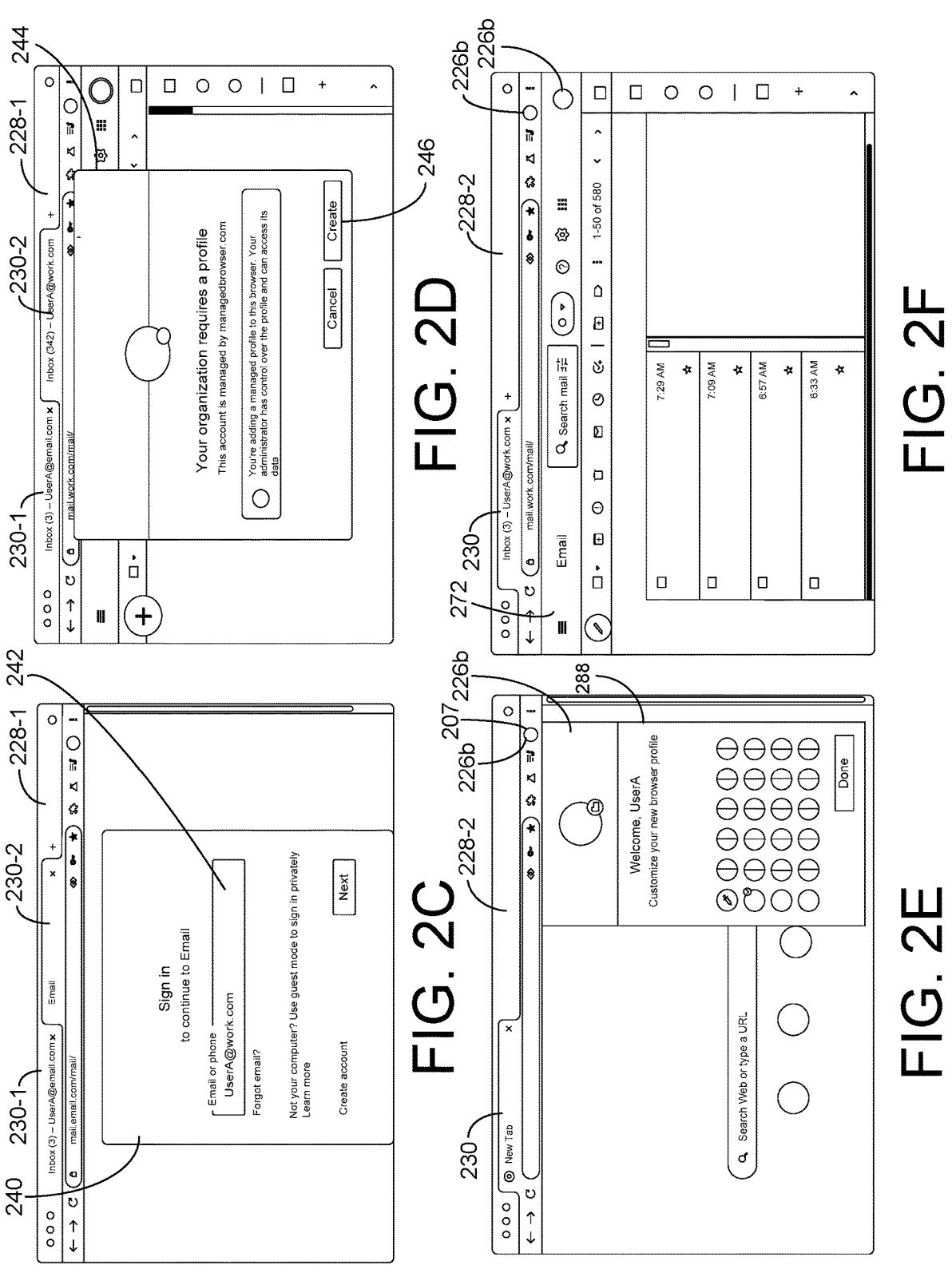

Referring to FIG. 2C, in response to the selection of UI element 284, the browser application may render a tab 230-2 in the context of the window 228-1 and under the browser profile 226a. The tab 230-2 may include an interface 240 configured to receive an authentication credential 242 of a user account. The user account could be a managed user account (e.g., user account 104b) or another (a different) unmanaged user account. In the example of FIG. 2C, the authentication credential 242 is associated with a managed user account.

Referring to FIG. 2D, in response to an authentication of the authentication credential 242, and to determining that the account associated with the authentication credential 242 is a managed user account, the browser application may render a UI object 244 that prompts the user to create a browser profile (e.g., browser profile 126b) for the managed user account. The UI object 244 may display information that indicates that an organization requires a browser profile 226b to be associated with the managed user account. The UI object 244 may include a UI element 246, which, when selected, causes the browser application to create the browser profile 226b.

Referring to FIG. 2E, in response to the selection of the UI element 246, which creates the browser profile 226b, the browser application may render a new window 228-2 associated with the browser profile 226b. The window 228-2 is a new instance of the browser application and includes a new tab 230. In some examples, a selectable icon 207 is associated with the browser profile 226b, which, when selected, causes the browser application to render a UI object 288 that enables the user to customize aspects of the browser profile 226b. For example, the user may select a background color that is applied to one or more sections of the user interface of the browser application.

Referring to FIG. 2F, in response to the selection to create the browser profile 226b or the customization of the browser profile 226b, the browser application renders a new window 228-2 associated with the browser profile 226b. In FIG. 2F, the window 228-2 may include a tab 230 that displays an email 272 of the managed user account. In this manner, when the user signs into a resource (e.g., email) of the browser application under the non-managed profile (e.g., the browser profile 226a), the browser application renders a new browser instance (e.g., window 228-2) with the browser profile 226b. Because the browser profile 226b is a managed profile, the browser application can apply the organization's browser settings to the browser profile 226b.

Figure 3A:
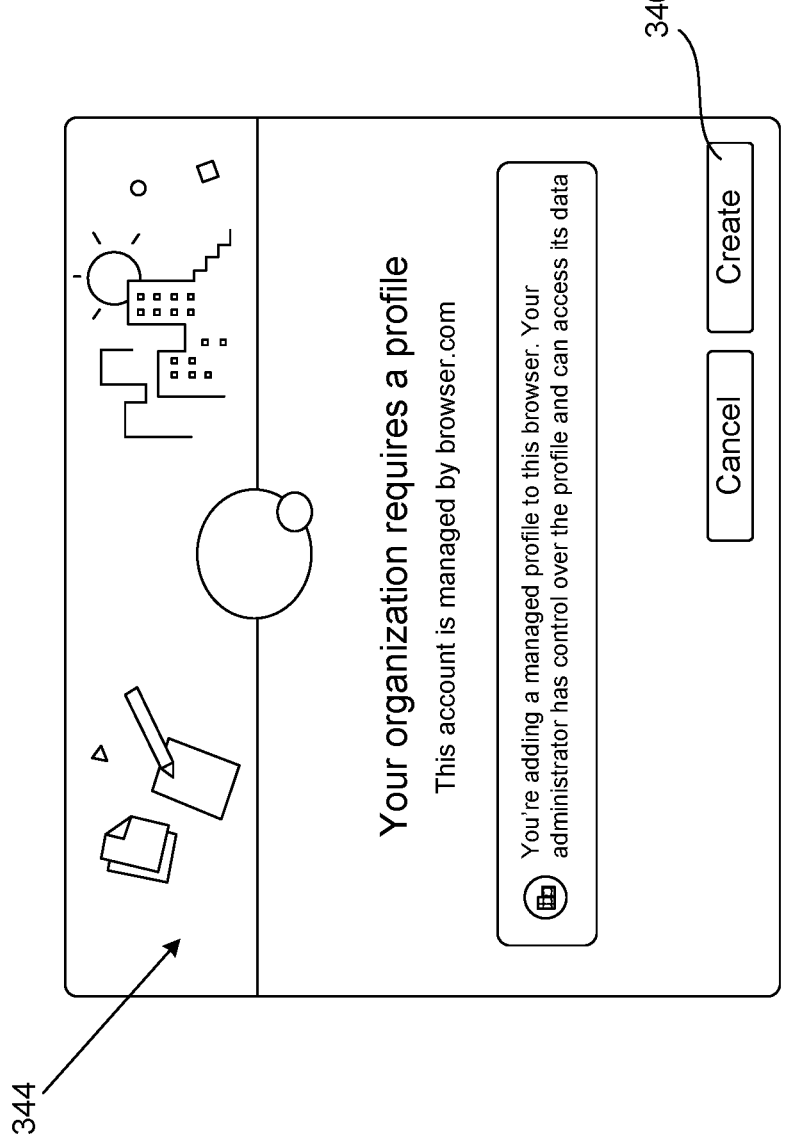
FIGS. 3A and 3B illustrate example user interfaces for enabling the creation of a browser profile for a managed user account and syncing browser data across user devices according to an aspect.
Figure 3B:
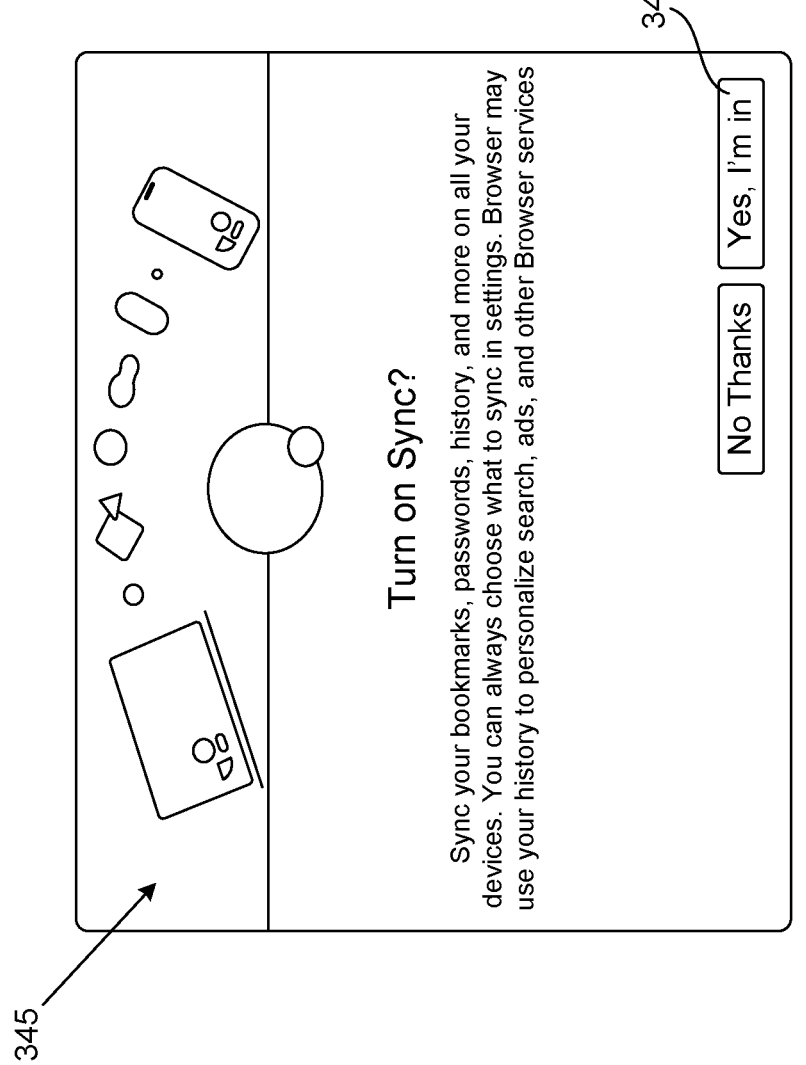

FIGS. 3A and 3B illustrate examples of interfaces of a browser application according to an aspect. The browser application may be an example of the browser application 122 of FIGS. 1A and 1B and may include any of the details discussed with reference to those figures.

Referring to FIG. 3A, in response to a managed user account being determined as not associated with a browser profile, the browser application may render a user interface (UI) object 344 that prompts the user to create a browser profile for the managed user account. For example, before the user is granted access to any of the resources associated with the managed user account, the user is required to have a browser profile that is associated with the managed user account. The UI object 344 may display information that indicates that an organization requires a browser profile to be associated with the managed user account. The UI object 344 may include a UI element 346, which, when selected, causes the browser application to create the browser profile.

Referring to FIG. 3B, in response to the browser profile being generated (e.g., in response to selection of the UI element 346), the browser application may render a UI object 345 that displays a selectable option 347 to sync one or more browser features across two or more devices associated with the managed user account. The browser features may include tab history, bookmarks, notes, reading lists, price trackers, reminders, passwords, settings, extensions, web applications, and other data across multiple installations of the browser application for a respective browser profile. For example, by selecting the syncing option, the browser application can sync these browser features across devices that are signed in using the managed user account.

Figure 3C:
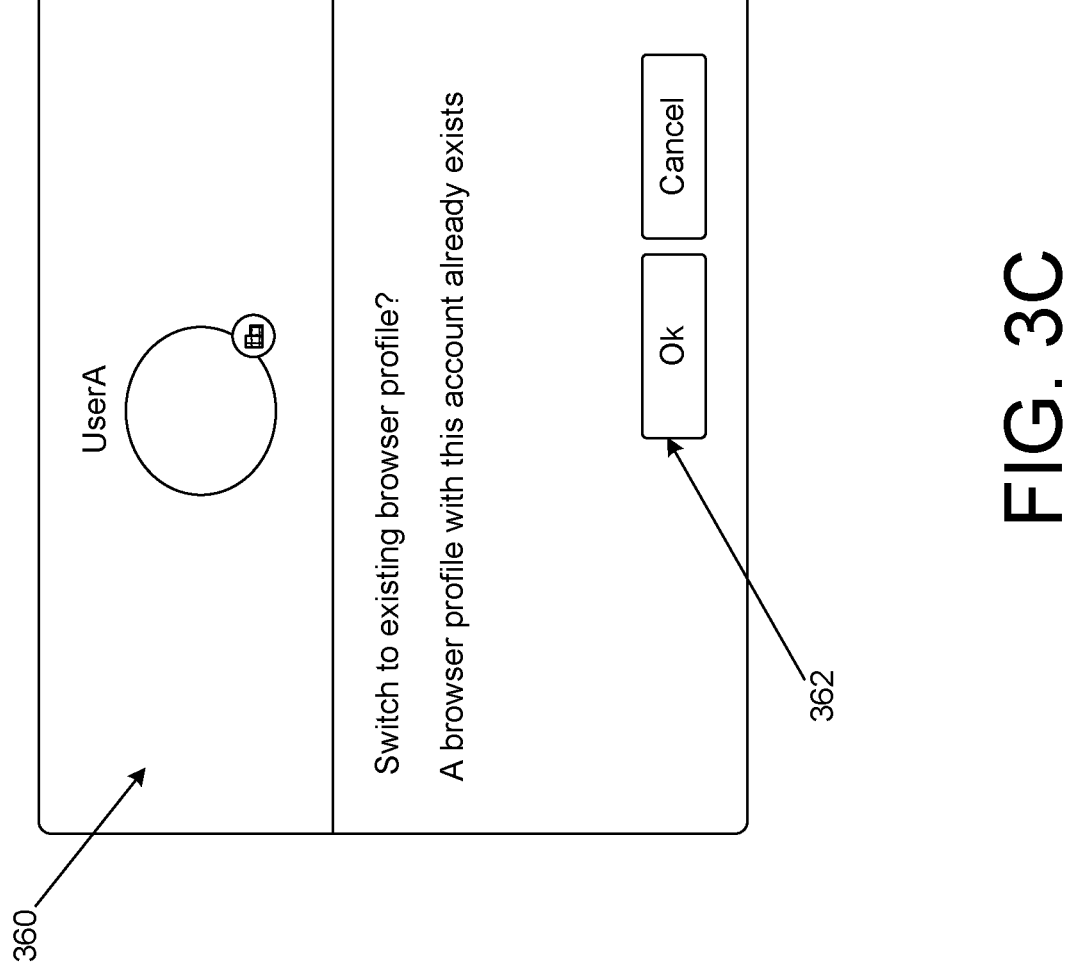
FIG. 3C illustrates an example user interface depicting a user interface object for informing a user that a browser profile already exists according to an aspect.

Referring to FIG. 3C, if a browser profile already exists for the managed user account when the user signs into the managed resource in a window associated with the non-managed profile, the browser application may generate and render a UI object 360 that notifies the user that an existing profile already exists. In some examples, the UI object 360 includes a selectable icon 362, which, when selected causes the browser application to generate and render a new browser instance (e.g., a new window) with the browser profile of the managed user account, where the new browser instance includes a new tab to access the resource.

Figure 4:
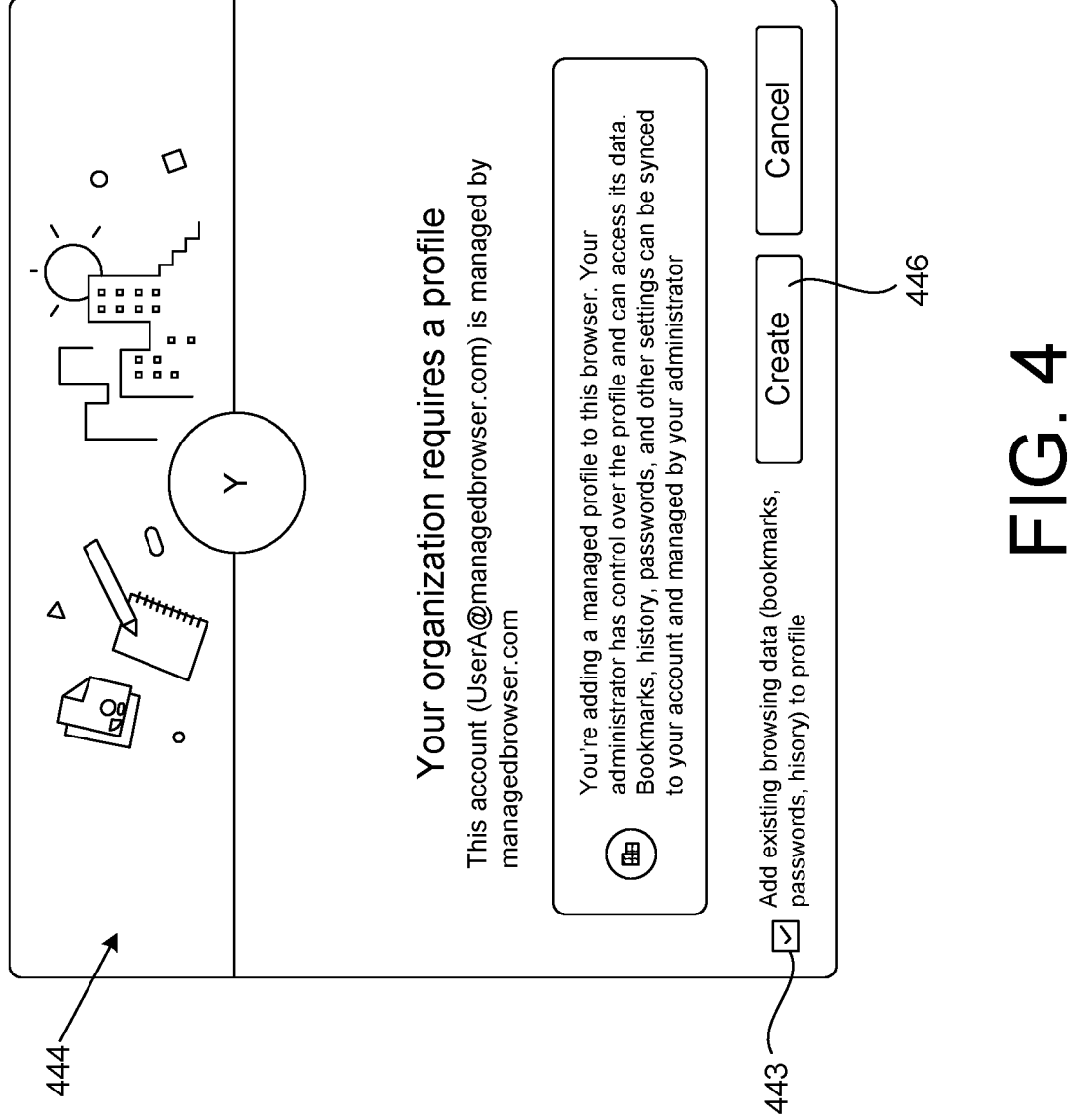
FIG. 4 illustrates an example of a user interface object for enabling the creation of a browser profile for a managed user account according to an aspect.

FIG. 4 illustrates an example of an interface of a browser application according to an aspect. The browser application may be an example of the browser application 122 of FIGS. 1A and 1B and may include any of the details discussed with reference to those figures. In response to a managed user account being determined as not associated with a browser profile, the browser application may render a user interface (UI) object 444 that prompts the user to create a browser profile for the managed user account. For example, before the user is granted access to any of the resources associated with the managed user account, the user is required to have a browser profile that is associated with the managed user account. The UI object 444 may display information that indicates that an organization requires a browser profile to be associated with the managed user account. The UI object 444 may include a UI element 446, which, when selected, causes the browser application to create the browser profile. The UI object 444 may also include a selectable option 443, which, when selected, causes the browser application to add existing browser data (e.g., bookmarks, passwords, history, etc.) to the browser profile. For example, the user can import existing browser data from one profile (e.g., a non-managed browser profile) to the newly-created browser profile (e.g., the managed browser profile).

Figure 5:
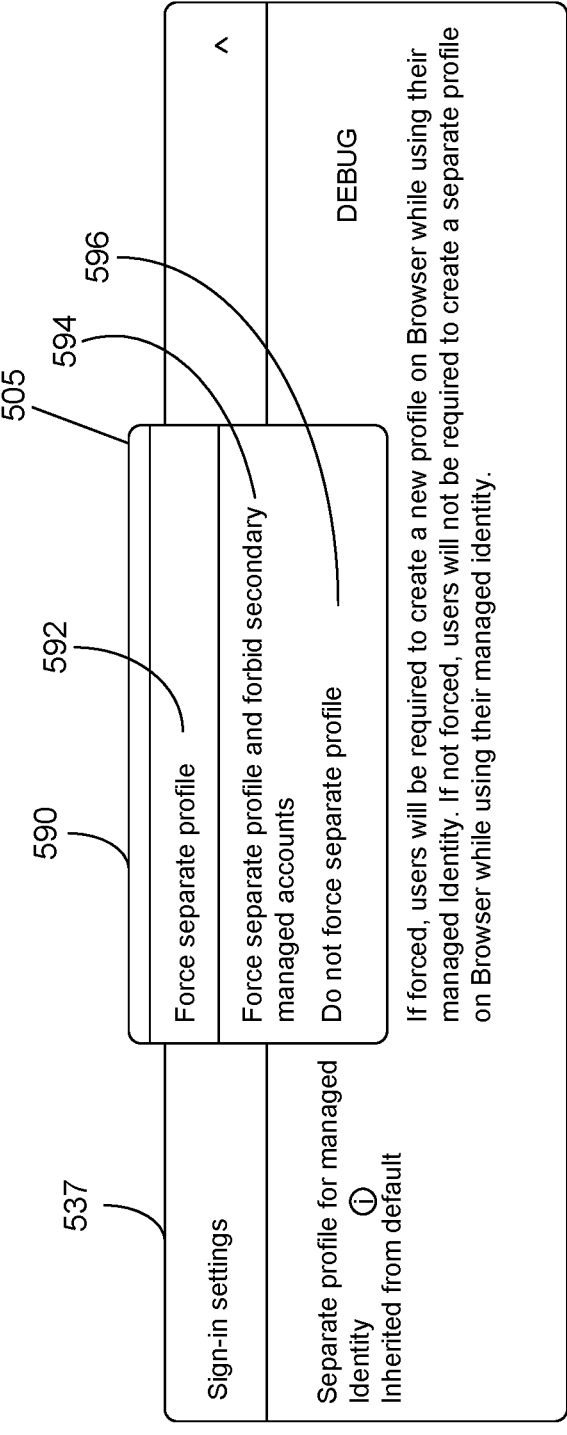
FIG. 5 illustrates an example of a portion of a user interface of an administrative console application for enabling a separation setting according to an aspect.

FIG. 5 illustrates an example of a portion of a user interface 537 of an administrative console application according to an aspect. For example, the user interface 537 may enable the administrator to define sign-in settings, which includes an option to define a separation setting 505 for managed user accounts. For example, the user interface 537 may display a UI object 590 that provides various options for defining (or not defining) the separation setting 505. For example, the UI object 590 may provide a selectable option 592 to force separate profiles, a selectable option 594 to force separate profiles and prevent secondary managed accounts, and a selectable option 596 to not force separate profiles. The selection of either selectable option 592 or selectable option 594 requires a user to set up a separate browser profile when the user signs into the browser application using their managed user account, and if a browser profile already exists for the managed user account, the browser application renders a new browser instance (e.g., a new window) with the browser profile of the managed user account. The selectable option 594 provides the additional feature of not allowing secondary managed accounts to the browser profile associated with the managed user account.

FIG. 6 illustrates a flowchart 600 depicting example operations of a management system according to an aspect. Although the flowchart 600 is explained with respect to the management system 100 of FIGS. 1A and 1B, the flowchart 600 may be applicable to any of the implementations discussed herein. Although the flowchart 600 of FIG. 6 illustrates the operations in sequential order, it will be appreciated that this is merely an example, and that additional or alternative operations may be included. Further, operations of FIG. 6 and related operations may be executed in a different order than that shown, or in a parallel or overlapping fashion.

The flowchart 600 enables an administrator to require a user to set up a separate browser profile 126*b* when the user signs into a browser application 122 using their managed user account 104*b* on a computing device 152 (e.g., an unmanaged device). If a browser profile 126*b* already exists for the managed user account 104*b*, the browser application 122 may render a new browser instance (e.g., a new window 128-2) with the browser profile 126*b* of the managed user account 104*b*. In this manner, browser settings 110*b* defined by an organization are applied only to the managed profile (e.g., the browser profile 126*b*), but not to non-managed profiles (e.g., browser profile 126*a*). For example, when the user signs into a resource 124 of the browser application 122 under the non-managed profile (e.g., the browser profile 126*a*), the browser application 122 renders a new browser instance (e.g., window 128-2) with the browser profile 126*b*. Because the browser profile 126*b* is a managed profile, the browser application 122 can apply the organization's browser settings 110*b* to the browser profile 126*b*.

Operation 602 includes rendering a first window 128-1 of a browser application 122 on a computing device 152, where the first window 128-1 has a first browser profile (e.g., browser profile 126*a*) associated with a non-managed user account 104*a* and the first window 128-1 displays a tab 130. Operation 604 includes receiving, via the tab 130, an authentication credential 142 of a managed user account 104*b* that is managed by an organization to access at least one resource 124 of the browser application 122. Operation 606 includes, in response to the authentication credential 142 being authenticated, determining whether the managed user account 104*b* is associated with a second browser profile (e.g., browser profile 126*b*). Operation 608 includes, in response to the managed user account 104*b* not being associated with the second browser profile, rendering a user interface (UI) object 144 that prompts a user to create the second browser profile for the managed user account 104*b*.

According to some aspects, the method includes, in response to determining that the managed user account is associated with the second browser profile, rendering a second window under the second browser profile, the second window including a new tab to access the resource. The method may include receiving, via the UI object, a selection to create the second browser profile for the managed user account, in response to the selection, generating the second browser profile for the managed user account, and rendering a second window with at least one browser setting defined by the second browser profile. The method may include receiving, over a network, browser control information from a server computer, the browser control information identifying the at least one browser setting for the browser application, the at least one browser setting being defined by an administrator of an organization and applying the at least one browser setting to the second window. The UI object is a first UI object, and the method may include, in response to the second browser profile being generated, rendering a second UI object that displays a selectable option to sync one or more browser features across two or more devices associated with the managed user account. The method may include, in response to the second browser profile being generated, rendering a second UI object that displays one or more UI controls to customize the second browser profile. The resource includes a web application executable by the browser application and associated with the managed user account.

According to an aspect, a non-transitory computer-readable medium storing executable instructions that when executed by at least one processor causes the at least one processor to execute operations. The operations include rendering a first window of a browser application on a computing device, the first window having a first browser profile associated with a non-managed user account, the first window displaying a tab, receiving, via the tab, an authentication credential of a managed user account that is managed by an organization to access a resource of the browser application, in response to the authentication credential being authenticated, determining whether the managed user account is associated with a second browser profile, and in response to determining that the managed user account is associated with the second browser profile, rendering a second window under the second browser profile, the second window including a new tab to access the resource.

The operations may include in response to determining that the managed user account is not associated with the second browser profile, rendering a user interface (UI) object that prompts a user to create the second browser profile for the managed user account. The operations may include receiving, via the UI object, a selection to create the second browser profile for the managed user account, in response to the selection, generating the second browser profile for the managed user account, and rendering a second window with at least one browser setting defined by the second browser profile. The UI object may be a first UI object, and the operations may include, in response to the second browser profile being generated, rendering a second UI object that displays a selectable option to sync one or more browser features across two or more devices associated with the managed user account. The operations may include, in response to the second browser profile being generated, rendering a second UI object that displays one or more UI controls to customize the second browser profile. The operations may include receiving, over a network, browser control information from a server computer, the browser control information identifying at least one browser setting for the browser application, the at least one browser setting being defined by an administrator of the organization and applying the at least one browser setting to the second window and not to the first window. The resource includes an email application or a file storage application associated with the managed user account.

An apparatus includes at least one processor, and a non-transitory computer-readable medium storing executable instructions that cause the at least one processor to render a first window of a browser application on a computing device, the first window having a first browser profile associated with a non-managed user account, the first window displaying a tab, receive, via the tab, an authentication credential of a managed user account that is managed by an organization to access a resource of the browser application, in response to the authentication credential being authenticated, determine whether the managed user account is associated with a second browser profile, and, in response to the managed user account not being determined as associated with the second browser profile, render a user interface (UI) object that prompts a user to create the second browser profile for the managed user account.

In some examples, the executable instructions include instructions that cause the at least one processor to, in response to the managed user account being determined associated with the second browser profile, render a second window under the second browser profile, the second window including a new tab to access the resource. The executable instructions include instructions that cause the at least one processor to receive, via the UI object, a selection to create the second browser profile for the managed user account, in response to the selection, generate the second browser profile for the managed user account, and render a second window with at least one browser setting defined by the second browser profile. The executable instructions include instructions that cause the at least one processor to receive, over a network, browser control information from a server computer, the browser control information identifying the at least one browser setting for the browser application, the at least one browser setting being defined by an administrator of the organization and apply the at least one browser setting to the second window and not to the first window. The UI object may be a first UI object, where the executable instructions include instructions that cause the at least one processor to, in response to the second browser profile being generated, rendering a second UI object that displays a selectable option to sync one or more browser features across two or more devices associated with the managed user account. The executable instructions include instructions that cause the at least one processor to in response to the second profile being generated, rendering a second UI object that displays one or more UI controls to customize the second browser profile.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

What is claimed is:

1. A method comprising:
rendering a first window of a browser application on a computing device, the first window operating under a browser profile authenticated with a non-managed user account of a user of the browser application, the first window including a first tab, the first tab identifying a web application for user selection;
rendering an authentication interface for the web application on the first tab;
receiving, via the authentication interface, an authentication credential of the user;
detecting that the authentication credential is associated with a managed user account of the user;
determining whether the managed user account is associated with an existing browser profile;
in response to determining that the managed user account is associated with the existing browser profile, rendering a second window operating under the existing browser profile authenticated with the managed user account, the second window including a second tab displaying an interface of the web application;
in response to determining that the managed user account is not associated with the existing browser profile, rendering a user interface object that prompts the user to create a new browser profile for the managed user account; and
in response to the new browser profile being generated, displaying a selectable option to enable synchronization of profile data between computing devices associated with the managed user account.

2. The method of claim 1, further comprising:
receiving, via the user interface object, a selection to create the new browser profile for the managed user account;
in response to the selection, generating the new browser profile for the managed user account; and
rendering the second window with the second tab.

3. The method of claim 1, wherein rendering the second window includes applying one or more administrator-defined browser settings to the second window, wherein rendering the first window includes applying one or more user-defined browser settings to the first window.

4. The method of claim 1, wherein the user interface object is a first user interface object, the method further comprising:
in response to the new browser profile being generated, rendering a second user interface object that displays one or more user interface controls to customize the new browser profile.

5. The method of claim 1, wherein the web application is an email application or a file storage application.

6. A non-transitory computer-readable medium storing executable instructions that when executed by at least one processor cause the at least one processor to execute operations, the operations comprising:
rendering a first window of a browser application on a computing device, the first window operating under a browser profile authenticated with a non-managed user account of a user of the browser application, the first window including a first tab, the first tab identifying a web application for user selection;
rendering an authentication interface for the web application on the first tab;
receiving, via the authentication interface, an authentication credential of the user;
detecting that the authentication credential is associated with a managed user account of the user;
determining whether the managed user account is associated with an existing browser profile;
in response to determining that the managed user account is associated with the existing browser profile, rendering a second window operating under the existing browser profile authenticated with the managed user account, the second window including a second tab displaying an interface of the web application;
in response to determining that the managed user account is not associated with the existing browser profile, prompting the user to generate a new browser profile for the managed user account; and
in response to the new browser profile being generated, displaying a selectable option to enable synchronization of profile data between computing devices associated with the managed user account.

7. The non-transitory computer-readable medium of claim 6, wherein the operations further comprise:
receiving, via a user interface object, a selection to create the new browser profile for the managed user account;
in response to the selection, generating the new browser profile for the managed user account; and
rendering the second window with the second tab.

8. The non-transitory computer-readable medium of claim 6, the operations further comprising:
in response to the new browser profile being generated, rendering a user interface object that displays one or more user interface controls to customize the new browser profile.

9. The non-transitory computer-readable medium of claim 6, wherein the operations further comprise:
receiving, over a network, at least one administrator-defined setting from a server computer,
wherein rendering the second window includes applying the at least one administrator-defined setting to the second window.

10. The non-transitory computer-readable medium of claim 6, wherein the first tab identifies a plurality of applications for selection by the user, the plurality of applications including the web application, a browser extension, and a website.

11. An apparatus comprising:

at least one processor; and a non-transitory computer-readable medium storing executable instructions that cause the at least one processor to:

render a first window of a browser application on a computing device, the first window operating under a browser profile authenticated with a non-managed user account of a user of the browser application, the first window including a first tab identifying a plurality of applications for selection by the user, the plurality of applications including a web application;

render an authentication interface for the web application on the first tab;

receive, via the authentication interface, an authentication credential of the user;

detect that the authentication credential is associated with a managed user account of the user;

determine whether the managed user account is associated with an existing browser profile;

in response to the managed user account being determined as associated with the existing browser profile, render a second window operating under the existing browser profile authenticated with the managed user account, the second window including a second tab displaying an interface of the web application;

in response to the managed user account not being determined as associated with the existing browser profile, render a user interface object that prompts the user to create a new browser profile for the managed user account; and in response to the new browser profile being generated, display a selectable option to enable synchronization of profile data between computing devices associated with the managed user account.

12. The apparatus of claim 11, wherein the executable instructions include instructions that cause the at least one processor to:

receive, via the user interface object, a selection to create the new browser profile for the managed user account;

in response to the selection, generate the new browser profile for the managed user account; and render the second window with the second tab.

13. The apparatus of claim 11, wherein the executable instructions include instructions that cause the at least one processor to:

receive, over a network, at least one administrator-defined setting from a server computer, wherein rendering the second window includes applying the at least one administrator-defined setting to the second window.

14. The apparatus of claim 11, wherein the user interface object is a first user interface object, wherein the executable instructions include instructions that cause the at least one processor to:

in response to the new browser profile being generated, render a second user interface object that displays one or more user interface controls to customize the new browser profile.

* * * * *